July 27, 1943.  C. B. GATY  2,325,313
ELECTRICAL CONNECTOR
Filed Nov. 19, 1941
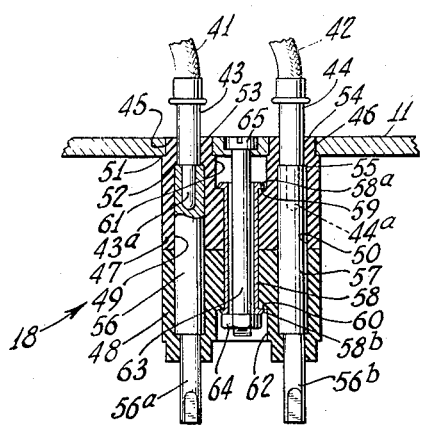
INVENTOR
CLINTON B. GATY.
BY
Blair, Curtis & Hayward
ATTORNEYS Patented July 27, 1943

2,325,313

UNITED STATES PATENT OFFICE 2,325,313

ELECTRICAL CONNECTOR

Clinton B. Gaty, Jamaica, N. Y., assignor to Fairchild Aviation Corporation, Jamaica, Long Island, N. Y., a corporation of Delaware Application November 19, 1941, Serial No. 419,684

2 Claims. (Cl. 173—332)

This invention relates to an electrical connector particularly adapted for use in a camera such as a small motion picture camera.

It is often desirable to equip modern military aircraft such as pursuits and interceptors with motion picture cameras of the nature described in the copending application of Gaty et al., Serial No. 395,098, filed May 24, 1941. These cameras are, in certain instances, mounted in the cockpit of the airplane adjacent the gun sight to photograph the field of view of the gun sight and, in other instances, are attached directly to the wing guns. In either event, space is at a premium which necessitates the use of a camera which is as small as possible.

Cameras of this sort are, of course, subjected to severe usage by reason of vibration, weather conditions and low temperatures at the substantial altitudes at which they operate. The camera, being so small, has but little space therewithin for the disposition of its essential mechanism which, accordingly, greatly limits the space available for other appliances. It is often desirable to equip such a camera with a lens heater such as is shown, for example, in my copending divisional application, Serial No. 458,506, filed September 16, 1942. A heater of this character necessitates an electrical connector and I have found that such a connector should be secured within the camera where it is most capable of withstanding all shocks and vibrations while still maintaining a good electrical contact with the leads to the heater.

Accordingly, it is among the objects of this invention to provide an electrical connector of the above nature which is simple, sturdy in construction, small in size yet capable of carrying substantial current and well able to withstand such shocks and vibrations to which it may be subjected. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

In the drawing there is shown an enlarged sectional elevation of the electrical connector attached to a portion of a camera.

As shown in the drawing, a top plate 11 of a camera (not shown) has secured thereto in a manner to be described my electrical connector generally indicated at 18 in a suitable position to receive the ends of leads 41 and 42.

Top plate 11 is drilled as at 45 and 46 to provide a pair of holes for the reception of jacks 43 and 44 into socket 18. Socket 18 comprises a pair of casings 47 and 48, and as these are identical, casing 47 only will be described. Thus, casing 47, which is preferably formed from a suitable dielectric material, is so molded as to provide a pair of chambers 49 and 50, which are parallel, and extend throughout the casing. Adjacent the upper end of chamber 49, the casing is shouldered as at 51 and 52, forming a reduced portion 53 which extends into hole 45 in camera top 11, being restrained from projecting past the top surface of top 11 by shoulder 51. A similar projection 54 is formed adjacent the upper end of chamber 50, and this projection extends into hole 46. Chamber 50 is also provided with a shoulder 55, similar to shoulder 52. Chambers 49 and 50, respectively, receive the upper or female ends of conductors 56 and 57, into which the reduced ends 43a and 44a of jacks 43 and 44 extend when the jacks are connected to socket 18. It may now be seen that conductors 56 and 57 are not only insulated from one another by casing 47, but are also amply insulated, as are jacks 43 and 44, from camera top 11 by projections 53 and 54 of the casing.

Casing 48 is provided with channels similar to the channels in casing 47, and these latter channels receive the lower or male ends of conductors 56 and 57, these male ends 56a and 56b extending from the bottom of casing 48, and being insulated from one another as in the case of the female ends of the conductors. Male ends 56a and 56b may be attached to suitable leads within the camera, which are connected to the main plug receptacle of the camera (not shown) but preferably these male ends are connected in series with a thermostat (not shown) mounted within the camera casing.

Casings 47 and 48 are provided with coaxial centrally disposed bores in which is disposed an eyelet 58, the opposite ends 58a and 58b of which are riveted or spun over to engage respectively shoulders 59 and 60, formed at the bottoms of recesses 61 and 62, respectively, in casings 47 and 48. Eyelet 58 thus holds the two casings together and furthermore provides a hole for the reception of a screw 63, which extends through top plate 11 and has threaded on the lower end thereof a nut 64 which when taken up on the screw holds socket 18 securely against the under side of top 11. Preferably top 11 is countersunk to receive the head 65 of screw 63 so that the top of the screw is flush with the surface of top plate 11. It will now appear that socket 18 is firmly secured to the camera top plate 11 in such a manner as to preclude its working loose by reason of gun recoil or plane vibration. Furthermore, the conducting portions of the socket, as well as jacks 43 and 44 are completely insulated from top plate 11, as well as from one another and in spite of the small size of the socket are well able to carry a substantial current. Furthermore, by reason of the small size of socket 18 it may be disposed within the camera where there is no danger of its being broken or knocked loose, and in spite of its small size, it is quite capable of receiving jacks 43 and 44 which, because of their relatively slight weight, have insufficient inertia to cause their working loose from recoil shock or airplane vibration.

It may now be seen that I have provided an electrical connector which attains the several objects set forth hereinabove in a thoroughly practical and efficient manner.

As many possible embodiments may be made of the above invention, and as many changes might be made in the embodiment above set forth, it is to be understood that all matter hereinbefore set forth, or shown in the accompanying drawing, is to be interpreted as illustrative and not in a limiting sense.

I claim:

1. An electric plug receiving device for use in a motion picture camera having a top plate, said device comprising, in combination, a pair of dielectric casings, a pair of chambers in each of said casings adapted to register when said casings are secured together, each of said casings having a centrally disposed hole extending axially therethrough, a tubular element extending through said holes and being headed over at each end to secure said casings together, a male-female conductor in each registering pair of chambers, the male end of each conductor extending exteriorly of said device and the female end of each conductor being disposed within said device, and a hollow projection formed adjacent each of said chambers on one of said casings adjacent the female ends of said conductors and adapted to extend through holes in said top plate to insulate from said top plate an electric plug connected to said device.

2. The combination of a pair of dielectric casings, said casings being similar to one another and each having a pair of chambers formed therein and a centrally disposed hole extending axially therethrough, the axes of said chambers and said hole being parallel, a pair of hollow projections formed on each of said casings respectively adjacent the outer ends of said chambers, the diameters of said chambers being greater than the diameters of the openings in said projections whereby a shoulder is formed between each chamber and its adjoining projection, the chambers and hole of one casing adapted to register respectively with the chambers and hole of the other casing when the two casings are secured together, a member extending through said registering holes in said casings to secure said casing together with said projections extending in opposite directions, and a shouldered conductor disposed in each registering pair of said chambers, said conductors having male and female ends, said male ends extending through the projections of one casing and said female ends underlying the projections on the other casing.

CLINTON B. GATY.